(12) United States Patent
Huang

(10) Patent No.: US 8,625,259 B2
(45) Date of Patent: Jan. 7, 2014

(54) SUPPORT AND DISPLAY DEVICE USING THE SAME

(75) Inventor: Yung-Sheng Huang, Tu-Cheng (TW)

(73) Assignee: Kunshan Eson Precision Engineering Co., Ltd., Kunshan (CN)

( * ) Notice: Subject to any disclaimer, the term of this patent is extended or adjusted under 35 U.S.C. 154(b) by 186 days.

(21) Appl. No.: 13/158,439

(22) Filed: Jun. 12, 2011

(65) Prior Publication Data

US 2012/0224303 A1 Sep. 6, 2012

(30) Foreign Application Priority Data

Mar. 2, 2011 (CN) .......................... 2011 1 0053429

(51) Int. Cl.
| H05K 5/00 | (2006.01) |
| H05K 7/00 | (2006.01) |
| G06F 1/16 | (2006.01) |
| H02B 1/00 | (2006.01) |
| F16M 13/00 | (2006.01) |

(52) U.S. Cl.
USPC ................. 361/679.01; 361/679.02; 361/600; 248/425

(58) Field of Classification Search
USPC ........ 361/679.22; 248/919, 398, 179.1, 184.1
See application file for complete search history.

(56) References Cited

U.S. PATENT DOCUMENTS

| 5,702,197 | A | * | 12/1997 | Chen ............................. 403/166 |
| 6,367,756 | B1 | * | 4/2002 | Wang ........................ 248/278.1 |
| 6,702,238 | B1 | * | 3/2004 | Wang ........................ 248/125.8 |
| 7,168,665 | B2 | * | 1/2007 | Hong et al. ................ 248/125.1 |
| 7,195,214 | B2 | * | 3/2007 | Lee et al. .................. 248/125.8 |
| 7,413,150 | B1 | * | 8/2008 | Hsu .......................... 248/123.11 |
| 7,636,984 | B2 | * | 12/2009 | Oh ................................. 16/374 |
| 7,876,552 | B2 | * | 1/2011 | Guo ........................ 361/679.07 |
| 2009/0151122 | A1 | * | 6/2009 | Chuan ............................. 16/340 |
| 2009/0256047 | A1 | * | 10/2009 | Zhao et al. .................... 248/408 |

* cited by examiner

*Primary Examiner* — Hoa C Nguyen
*Assistant Examiner* — Ahmad D Barnes
(74) *Attorney, Agent, or Firm* — Altis Law Group, Inc.

(57) ABSTRACT

A display device includes a display panel, a base, and a support connected to the display panel and the base. The support includes a first rotating member fixed to the display panel, a second rotating member fixed to the base, a connecting shaft, and a rotating shaft. The connecting shaft is rotatably connected to the second rotating member and able to rotate about a first axis. The a rotating shaft rotatably connects the first rotating member to the connecting shaft, allowing the connecting shaft to rotate about a second axis.

13 Claims, 6 Drawing Sheets

SUPPORT AND DISPLAY DEVICE USING THE SAME

BACKGROUND

1. Technical Field

The present disclosure relates to a hinge structure and a display device using the hinge structure.

2. Description of Related Art

Display devices, e.g., LCD displays, for a desktop computer, usually include a base, a display panel, and a support connected between the base and the display panel. The display panel can be rotatably connected to the support, such that a user can adjust the display to a suitable orientation for better viewing. Although the conventional support can satisfy basic requirements, it is always desirable and useful for a new type of support and display device using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are now described in detail, with reference to the accompanying drawings.

Figure 1:
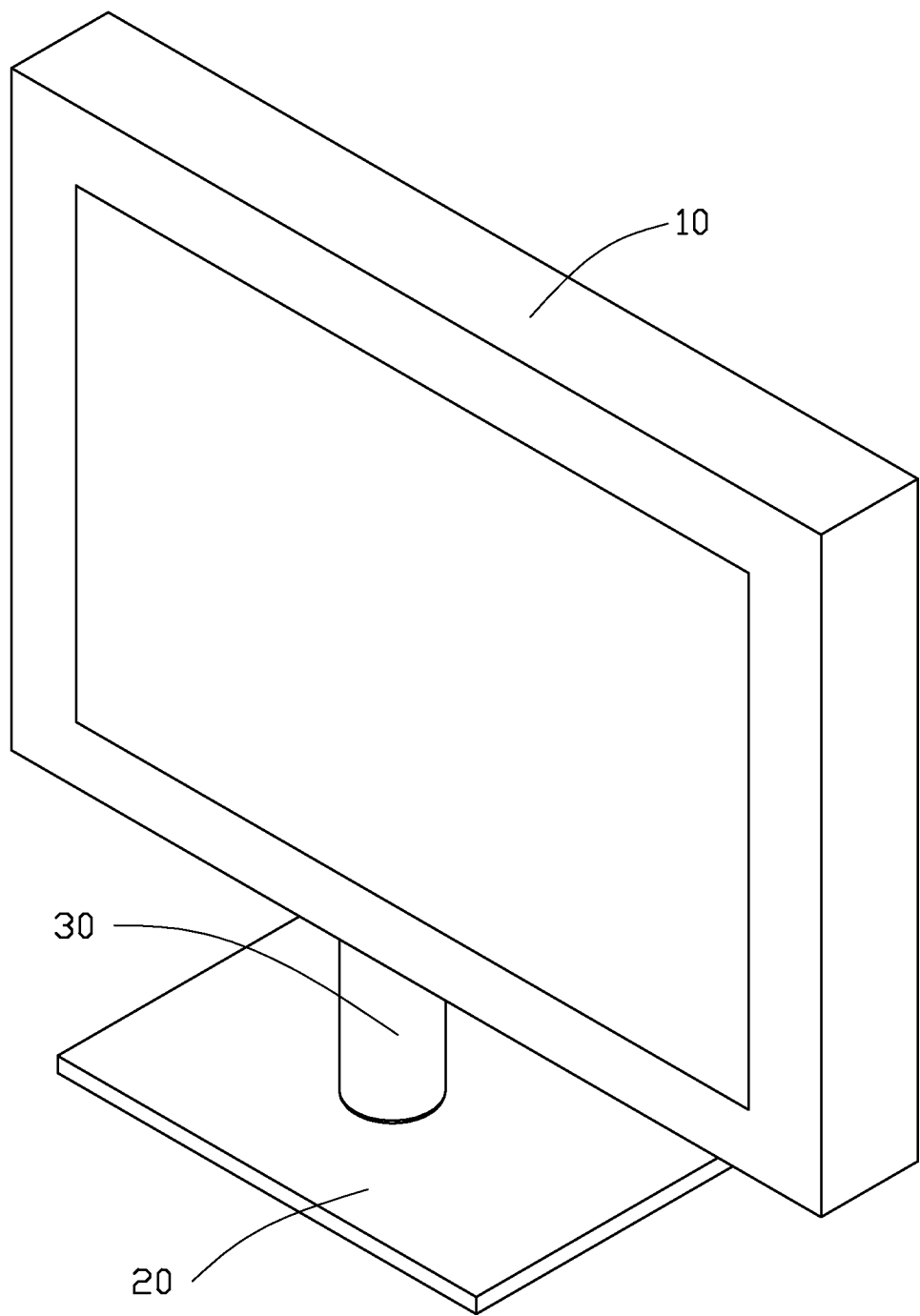
FIG. 1 is an isometric view of a display device according to an exemplary embodiment.

Referring to FIG. 1, a display device 1 according to an exemplary embodiment is illustrated. The display device 1 includes a display panel 10, a base 20, and a support 30 connected to the display panel 10 and the base 20.

Figure 2:
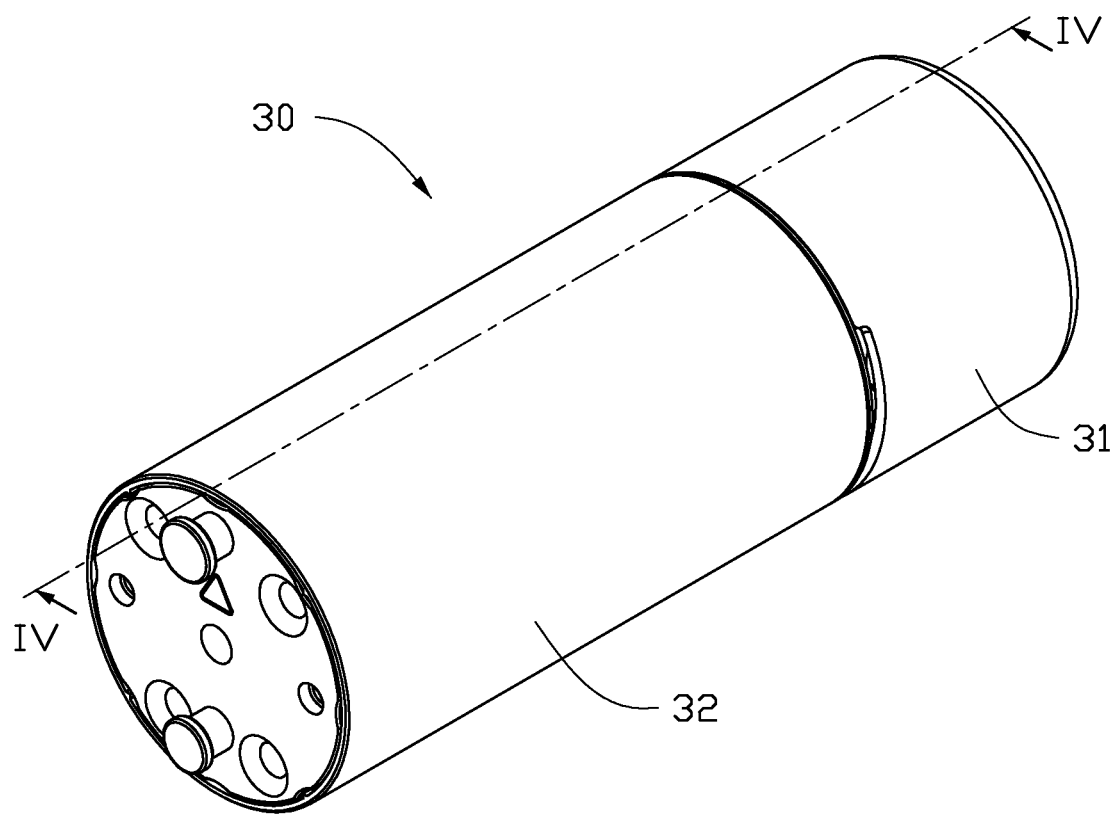
FIG. 2 is an isometric view of a support structure of the display device of FIG. 1, according to an exemplary embodiment.
Figure 3:
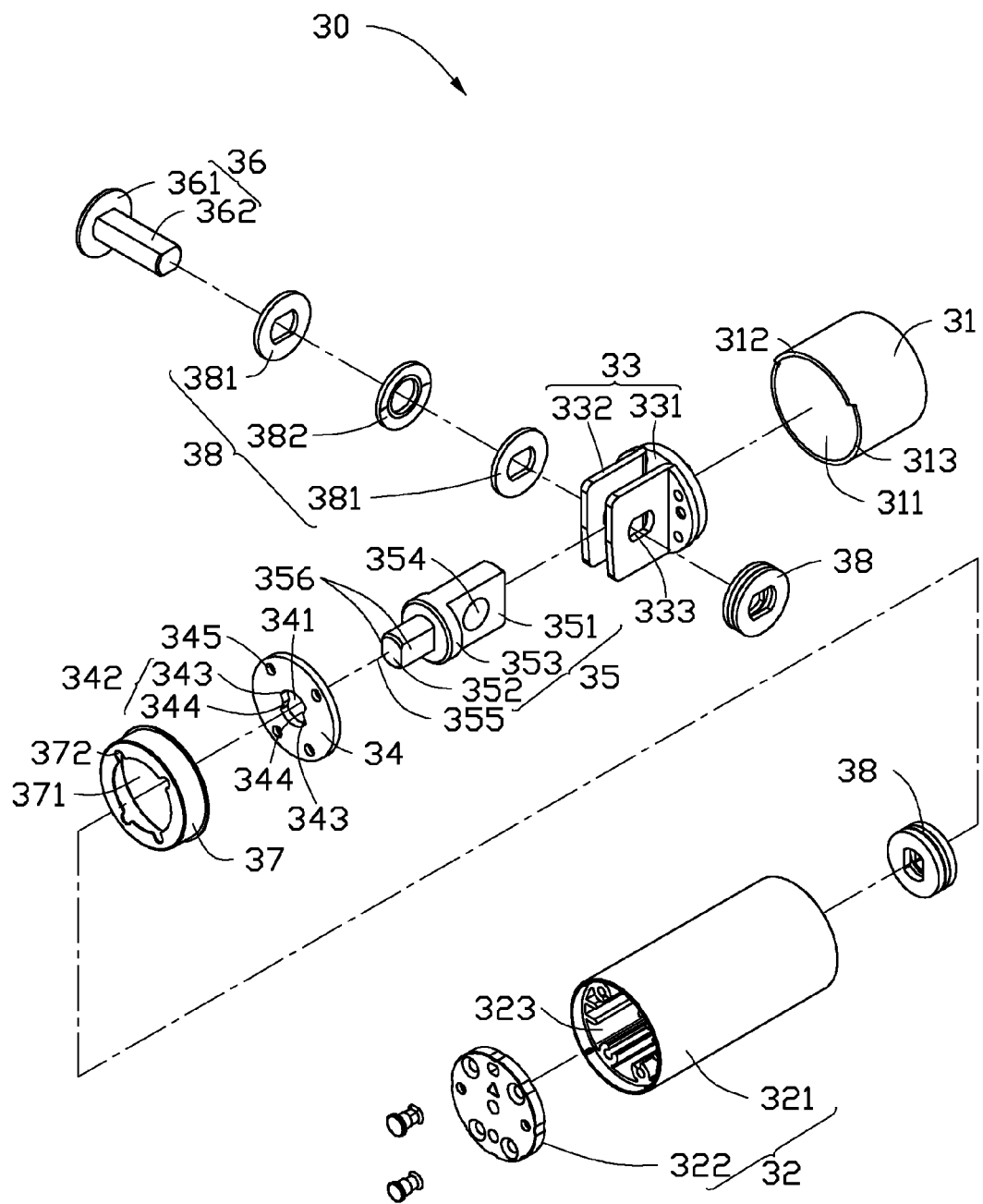
FIG. 3 is an exploded view of the support structure of FIG. 2.
Figure 4:
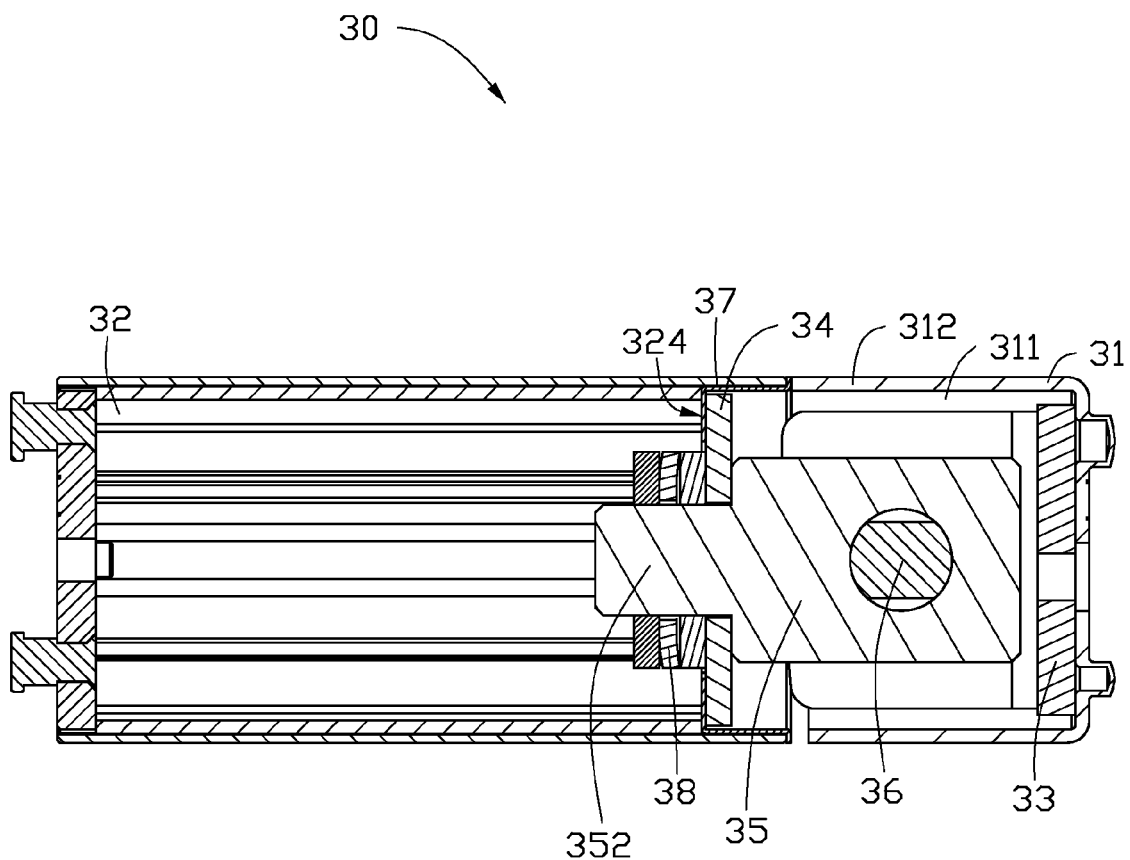
FIG. 4 is a cross-section view of the support structure take along line IV-IV of FIG. 3.

Referring to FIGS. 2-4, the support 30 includes a first housing 31, a second housing 32, a first rotating member 33 received in first housing 31, a second rotating member 34 received in the second housing 32. The first housing 31 is fixed to the display panel 10, and the second housing 32 is fixed to the base 20.

The first housing 31 hollow and cylindrical, and defines a chamber 311 facing the second housing 32 and includes a first edge 312 and a second edge 313 around an open end of the chamber 311. As can be seen in FIG. 4, the first edge 312 is higher than the second edge 313.

The second housing 32 includes a cylindrical main body 321 that defines a receiving chamber 323 and a fixing plate 322 detachably fixed to one end of the main body 321. In the embodiment, the receiving chamber 323 is a stepped hole that defines an annular shoulder 324.

The first rotating member 33 includes a fixing plate 331 and two protruding walls 332 protruding from the fixing plate 331. The fixing plate 331 is fixed to a bottom of the chamber 311 of the first housing 31. The two protruding walls 332 are substantially parallel to each other and each define a first hole 333 aligned with each other.

The second rotating member 34 defines a second hole 341 and includes two limiting protrusions 342 in the lateral surface of the second hole 341. In the embodiment, the limiting protrusion 342 is v-shaped and each includes a first inclined surface 343 and a second inclined surface 344 that intersect with each other. The first inclined surface 343 of one limiting portion 342 is adjacent to the second inclined surface 344 of the other one limiting portion 342. The second rotating member 34 further defines a plurality of fastening holes 345.

The support 30 further includes a connecting shaft 35 rotatably connected to the second rotating member 34 and a rotating shaft 36 rotatably connecting the first rotating member 33 to the connecting shaft 35.

The connecting shaft 35 includes a plate portion 351, a shaft portion 352, and a middle portion 353 connected between the plate portion 351 and the shaft portion 352. The plate portion 351 is sandwiched between the two protruding walls 332 of the first rotating member 33. The plate portion 351 defines a third hole 354 aligned with the first hole 333 of the first rotating member. The shaft portion 352 extends through the second hole 341 of the second rotating member 34, and the middle portion 353 abuts against the second rotating member 34. The shaft portion 352 includes two opposite cutting sides 356. The connecting shaft 35 can rotate about its axis 355 relative to the second rotating member 34 from a first position to a second position. In the first position, two opposite cutting sides 356 of the shaft portion 352 respectively abut against the first inclined surfaces 343 of the two limiting portions 342. In the second position, the two opposite cutting sides 356 of the shaft portion 352 respectively abut against the second walls 344 of the two limiting portions 342. In the embodiment, the rotation range is set to be about 20 degrees.

The rotating shaft 36 includes a head 361 and a shank 362 protruding from the head 361. The shank 362 extends through the first hole 333 of the first rotating member 33 and the third hole 354 of the connecting shaft 35, thereby rotatably connecting the first rotating member 33 to the connecting shaft 35. The first rotating member 33 can be rotated about the rotating shaft 36 from a first position where the first edge 312 contacts the second housing 32 to a second position where the second edge 313 contacts the second housing 32.

In the embodiment, the support 30 further includes an accepter 37 and a number of fastening assemblies 38.

The accepter 37 defines a center hole 371 that the shaft portion 352 of the connecting shaft 35 extends through, and a number of through holes 372 respectively aligned with the fastening holes 345 of the second rotating member 34. The accepter 37 is fixed to the annular wall 324 of the second housing 32, and the second rotating member 34 is received in the accepter 37. A number of fasteners (not shown) extend through the fastening holes 345 and through holes 372, thereby fixing the second rotating member 34 to the second housing 32.

Each fastening assembly 38 includes two nuts 381 and a washer 382 positioned between the two nuts 381. Two fastening assemblies 38 are sleeved on the shaft portion 352 of the connecting shaft 35 and abut against two protruding walls 332 of the first rotating member 33 to prevent the rotating shaft 36 from disengaging from the first rotating member 33. One fastening assembly 38 is sleeved on the shank 362 of the rotating shaft 36 to prevent the second rotating member 34 from disengaging from the connecting shaft 35.

Figure 5:
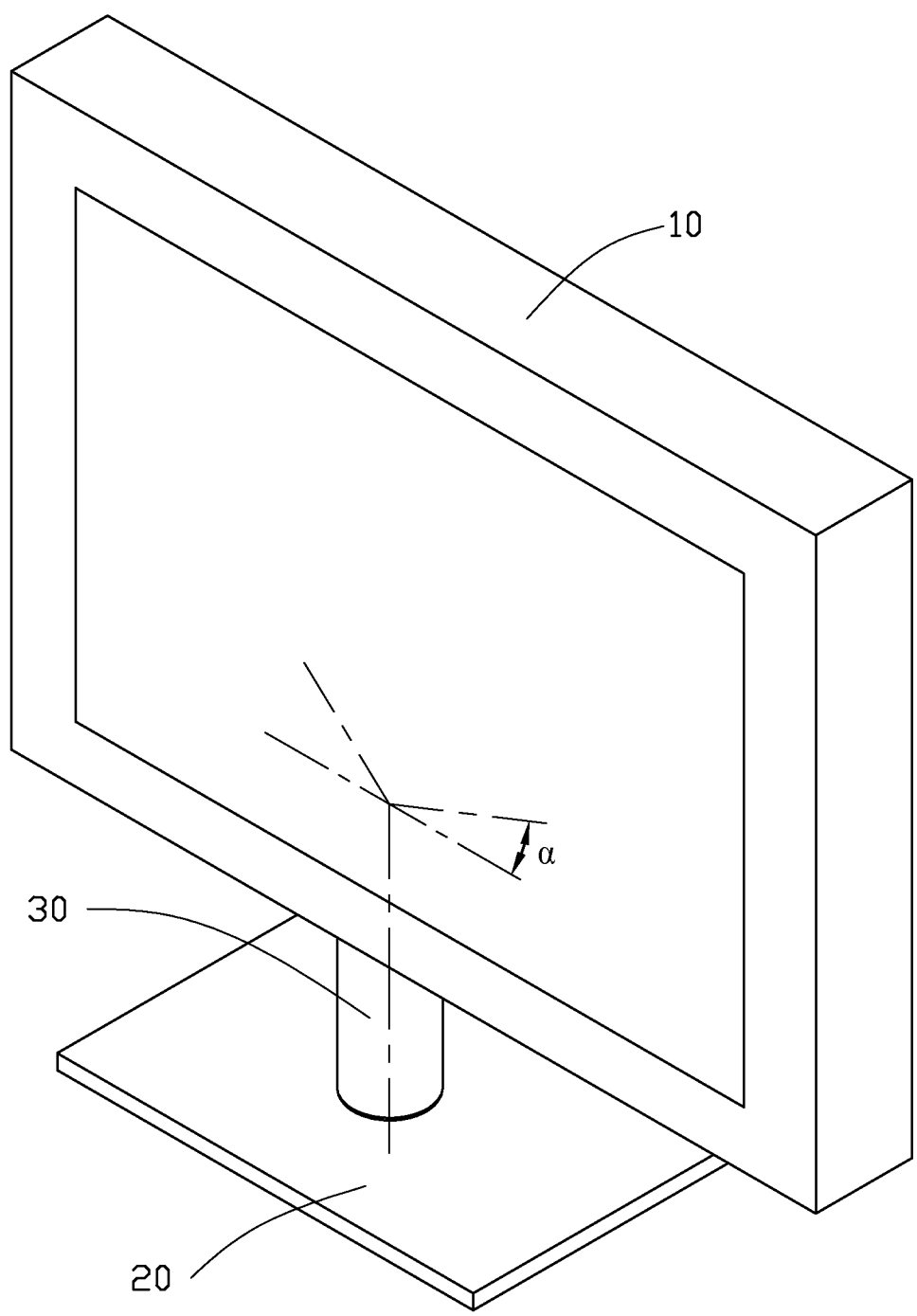
FIGS. 5-6 are schematic views of the display device of FIG. 1, showing the display can be rotated relative to a base.

Referring also to FIG. 5, when attempting to adjust the orientation of the display panel 20, the first housing 31 and the first rotating member 32 cooperating with the connecting shaft 35 can be rotated about its axis 355 with respect to the second housing 32. Thus, the display panel 10 fixed to the first housing 31 can be rotated as shown by the arrow of FIG. 5 relative to the base 20 fixed to the second housing 32.

Figure 6:
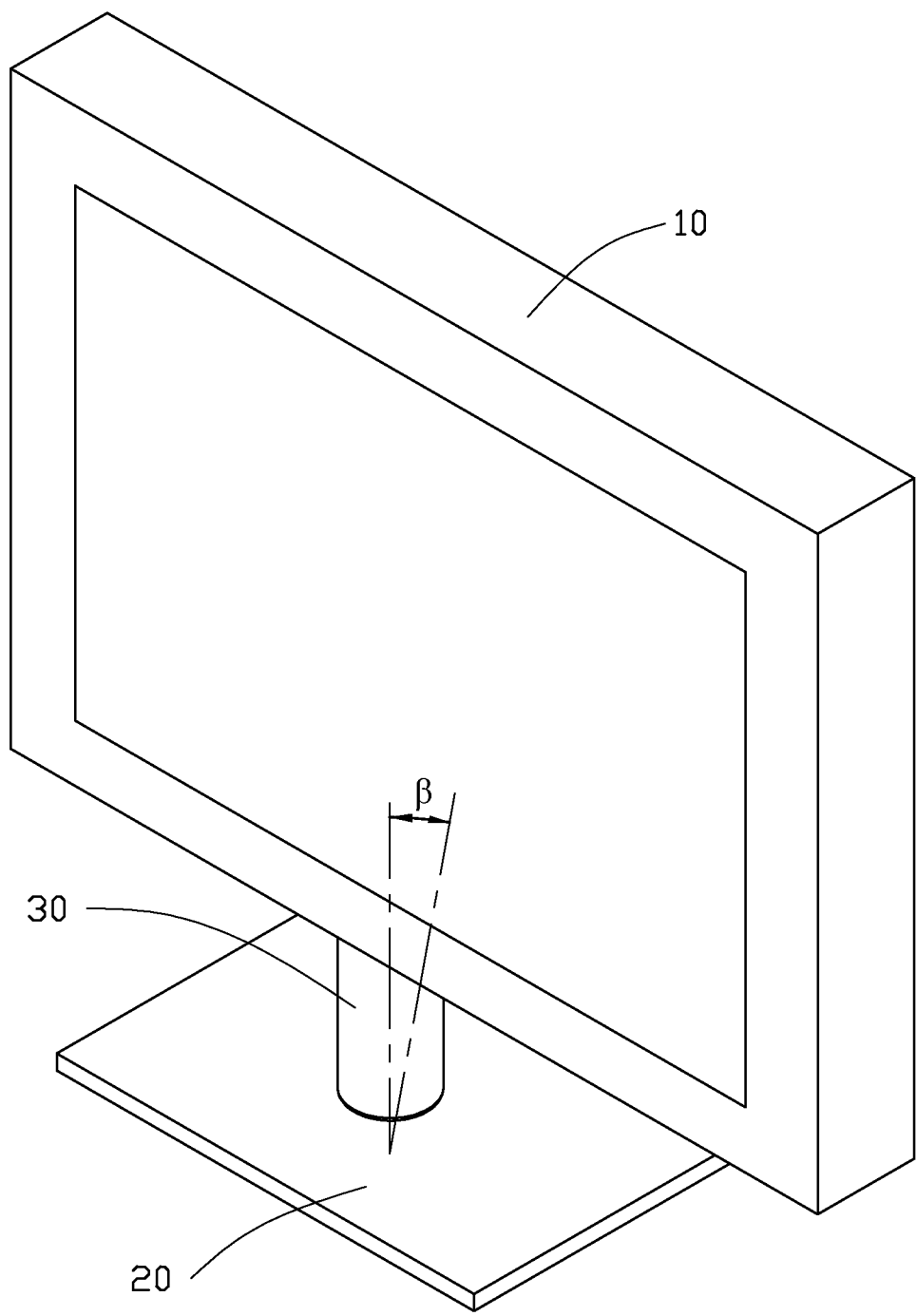

Referring also to FIG. 6, when needed, the first rotating member 33 can also be rotated about the rotating shaft 36 relative to the connecting shaft 35 which is connected to the second housing 32 and the second rotating member 34. Thus, the display panel 10 can be rotated relative to the base 20 as shown by the arrow of FIG. 6.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A support comprising:
a first rotating member;
a second rotating member
a connecting shaft rotatably connected to the second rotating member, and able to rotate about a first axis;
a rotating shaft rotatably connecting the first rotating member to the connecting shaft, allowing the connecting shaft to rotate about a second axis;
a first housing defining a chamber for receiving the first rotating member, wherein the first housing comprises a first edge and a second edge around an open end of the chamber, and the first edge is higher than the second edge and the first rotating member is capable of being rotated about the rotating shaft from a first position where the first edge contacts the second housing to a second position where the second edge contacts the second housing; and
a second housing defining a receiving chamber for receiving the second rotating member, wherein the first rotating member comprises a fixing plate fixed to a bottom of the chamber.

2. The support as described in claim 1, wherein the first axis is substantially perpendicular to the second axis.

3. The support as described in claim 1, wherein the second housing defines a stepped hole with an annular wall, the support further comprises an accepter fixed to the annular wall, and the second rotating member is received in the accepter.

4. The support as described in claim 1, wherein the first rotating member comprises two protruding walls each defining a first hole aligned to each other, the connecting shaft comprises a plate portion sandwiched between the two protruding walls and defining a third hole aligned to the first hole, and the rotating shaft comprises a shank extending through the first holes and the third hole.

5. The support as described in claim 1, wherein the second rotating member defines a second hole, and the connecting shaft comprises a shaft portion extending through the second hole.

6. The support as described in claim 5, wherein the second rotating member comprises two limiting protrusion in the lateral surface of the second hole, each limiting protrusion comprises a first inclined surface and an opposite second inclined surface, and the first inclined surface of one limiting protrusion is adjacent to the second inclined surface of the other one limiting protrusion.

7. A display device comprising:
a display panel;
a base; and
a support connected to the display panel and the base, the support comprising:
a first rotating member fixed to the display panel;
a second rotating member fixed to the base;
a connecting shaft rotatably connected to the second rotating member, and able to rotate about a first axis;
a rotating shaft rotatably connecting the first rotating member to the connecting shaft, allowing the connecting shaft to rotate about a second axis;
a first housing defining a chamber for receiving the first rotating member, wherein the first housing comprises a first edge and a second edge around an open end of the chamber, and the first edge is higher than the second edge and the first rotating member is capable of being rotated about the rotating shaft from a first position where the first edge contacts the second housing to a second position where the second edge contacts the second housing; and
a second housing defining a receiving chamber for receiving the second rotating member, wherein the first rotating member comprises a fixing plate fixed to a bottom of the chamber.

8. The display device as described in claim 7, wherein the first axis is substantially perpendicular to the second axis.

9. The display device as described in claim 7, wherein the second housing defines a stepped hole with an annular wall, the support comprises an accepter fixed to annular wall, and the second rotating member is fixably received in the accepter 10. The display device as described in claim 7, wherein the first rotating member comprises two protruding walls each defining a first hole aligned to each other, the connecting shaft comprises a plate portion sandwiched between the two protruding walls and defining a third hole aligned to the first holes, and the rotating shaft comprises a shank extending through the first holes and the third hole.

11. The display device as described in claim 7, wherein the second rotating member defines a second hole, the connecting shaft comprises a shaft portion extending through the second hole of the second rotating member.

12. The display device as described in claim 11, wherein the second rotating member comprises two limiting protrusion in the lateral surface of the second hole, each limiting protrusion comprises a first inclined surface and an opposite second inclined surface, and the first inclined surface of one limiting protrusion is adjacent to the second inclined surface of the other one limiting protrusion.

13. A support comprising:
a first rotating member;
a second rotating member;
a connecting shaft comprising a shaft portion and a plate portion integrally connected to each other, wherein the shaft portion is rotatably connected to the second rotating member and thus rotatable with respect to the second rotating member about a first axis, and the first rotating member is rotatably connected to the plate portion and thus rotatable with respect to the plate portion about a second axis; and
a first housing defining a chamber for receiving the first rotating member and a second housing defining a receiving chamber for receiving the second rotating member, wherein the first housing comprises a first edge and a second edge around an open end of the chamber, and the first edge is higher than the second edge and the first rotating member is rotatable about the rotating shaft from a first position where the first edge contacts the second housing to a second position where the second edge contacts the second housing.

* * * * *